United States Patent [19]
Smith

[11] Patent Number: 5,835,981
[45] Date of Patent: Nov. 10, 1998

[54] TERMINAL BLOCK MOUNTING METHOD AND APPARATUS

[75] Inventor: William D. Smith, Marietta, Ga.

[73] Assignee: Communications Technology Corporation, Madison, Ala.

[21] Appl. No.: 779,782

[22] Filed: Jan. 7, 1997

[51] Int. Cl.$^6$ ................................................ H02G 15/06
[52] U.S. Cl. ........................................... 174/82; 174/92
[58] Field of Search ................................ 174/92, 93, 79, 174/82

[56] References Cited

U.S. PATENT DOCUMENTS

| | | | |
|---|---|---|---|
| 3,514,526 | 5/1970 | Arnold, Jr. | 174/53 |
| 3,617,612 | 11/1971 | Patton | 174/59 |
| 3,742,119 | 6/1973 | Newman | 174/65 R |
| 4,151,926 | 5/1979 | Kinney et al. | 220/3.94 |
| 4,403,106 | 9/1983 | Lask et al. | 174/59 |
| 4,449,015 | 5/1984 | Hotchkiss et al. | 174/138 F |
| 4,723,919 | 2/1988 | Crane | 439/521 |
| 4,731,501 | 3/1988 | Clark et al. | 174/65 R |
| 4,910,770 | 3/1990 | Collins et al. | 379/399 |
| 5,117,067 | 5/1992 | Jaycox | 174/93 X |
| 5,145,388 | 9/1992 | Brownlie et al. | 439/142 |
| 5,219,302 | 6/1993 | Robertson et al. | 439/404 |

OTHER PUBLICATIONS

Installation Guide for Raychem Corporation D Terminator 2 SPT Cable Terminal Enclosure, Aug. 1994.

*Primary Examiner*—Bot L. Ledynh
*Assistant Examiner*—Marc D. Machtinger
*Attorney, Agent, or Firm*—Watts, Hoffmann, Fisher & Heinke Co.

[57] ABSTRACT

An aerial enclosure for a terminal block and method for installing the terminal block and a cable connected thereto within the enclosure. The enclosure includes a housing that defines an interior region adapted to contain the terminal block. The housing has an open front face and includes a rear wall, and a number of side walls that border the interior region. A cover is connected to the housing and is moveable to either cover or expose the interior region. One side wall of the housing includes a terminal block opening sized to permit insertion therethrough of the terminal block and cable. An entrance cap is adapted to cover the terminal block opening and defines a through passage sized to permit the cable to extend through the through passage. During manufacture, the entrance cap can be installed onto the cable before or after the cable is connected to the terminal block. The entrance cap is attached to the enclosure so that the terminal block opening is covered by the entrance cap.

11 Claims, 9 Drawing Sheets

TERMINAL BLOCK MOUNTING METHOD AND APPARATUS

FIELD OF THE INVENTION

The present invention concerns an aerial enclosure for a terminal block and, more particularly, an aerial enclosure that has an entrance cap that makes it easier to install the terminal block within the enclosure.

BACKGROUND ART

In the telecommunications industry, trunk cables deliver signals from a telephone company office to subscribers throughout a region. At spaced locations the trunk cables are tapped into and routed to a terminal block mounted within an enclosure that protects the terminal block from moisture, dirt or other elements. Within the enclosure a terminal block is connected to multiple strands of a cable stub which splices into the telephone feeder cable.

The terminal block is installed at the factory where the enclosure is assembled. Installation of the terminal block is difficult because the cable stub must be fed through an opening of the enclosure from the inside before the terminal block is mounted to a wall in the enclosure. This requires the unwinding of a long coil of cable stub, which is typically reinforced with a metal sheath, and then the recoiling of that cable once the cable stub is pushed through the opening and the terminal block is installed within the enclosure.

One prior art technique used to simplify the cable-feed step is to provide a u-shaped grommet member that is installed into a u-shaped cutout in a wall of the enclosure. The grommet includes an opening through which the cable is fed. The grommet avoids having to simultaneously manipulate the cable and terminal block to feed the cable through an enclosure opening. Instead, the installer slides the grommet over the cable. The grommet, with the cable extending therethrough, is then inserted into the u-shaped cutout in the enclosure wall as the terminal is placed into the enclosure. This technique is embodied in Raychem housing model number DT25P2 supplied by Raychem Corporation of Fuquay-Varina, North Carolina.

DISCLOSURE OF THE INVENTION

The present invention provides an improved enclosure apparatus for a terminal block having an electrically attached cable stub and a method for easily installing the terminal block within the enclosure. The invention includes a housing that defines an interior region adapted to contain the terminal block. The housing has an open front face and includes a rear wall, and a number of side walls that border the interior region. A cover is connected to the housing and is moveable so that, in a first position, the interior region is enclosed and, in a second position, the cover is moved to a position that exposes the interior region. One of the side walls of the housing includes a terminal block opening that allows the terminal block to be pushed into the housing interior region through the terminal block opening.

An entrance cap is adapted to cover the terminal block opening. The entrance cap is mounted on the cable stub before the cable stub is connected to the terminal block. The cable stub extends through a through passage in the entrance cap.

In accordance with the present invention, the cable stub is inserted through the cable through passage of the entrance cap prior to connecting the cable to the terminal block. The terminal block, cable stub, and entrance cap are most preferably manufactured to form a single assembly. A fabricator inserts the terminal block through the terminal block opening and then attaches the entrance cap to the enclosure. The terminal block may be attached to a wall of the enclosure either before or after attaching the entrance cap to the enclosure. In either case the awkward cable-feed step needed in one existing manufacturing procedure is eliminated, thereby reducing handling difficulties and saving installation time.

In accordance with a preferred embodiment of the invention, the cover and the enclosure walls are constructed from plastic. The engagement between the plastic walls and the plastic entrance cap impedes water from flowing past the entrance cap into the housing interior. This may at least in part be due to the fact that the entrance cap is bounded on all sides by the plastic wall with which the end cap mates. Especially when using plastic it is preferred to bound the entrance cap opening on all four sides to maintain structural integrity.

Alternatively, the assembler who assembles the enclosure may insert the terminal block into the enclosure, and simply slide the entrance cap over the cable stub that is already attached to the terminal block. In so doing, installation of the terminal block and cable is substantially simplified since the installer need only handle the entrance cap during the cable-feed step, instead of having to manipulate the cable and terminal block simultaneously.

In accordance with a preferred embodiment of the invention, the wall that defines the terminal block opening includes a flange extending outwardly from a surface of the wall near the perimeter of the terminal block opening. The entrance cap defines a recess adapted to receive the flange when the entrance cap is pushed over the flange to secure the entrance cap. The entrance cap sealingly engages the flange so that dust, moisture, or other foreign substances are substantially inhibited from entering the terminal block opening of the enclosure.

From the above it is seen that one object of the invention is the simple installation of a terminal block without the difficulties associated with handling the terminal block and cable. This and other objects, advantages and features of the invention will be described in conjunction with a detailed description of a best mode for practicing the invention.

BEST MODE FOR PRACTICING THE INVENTION

Figure 1:
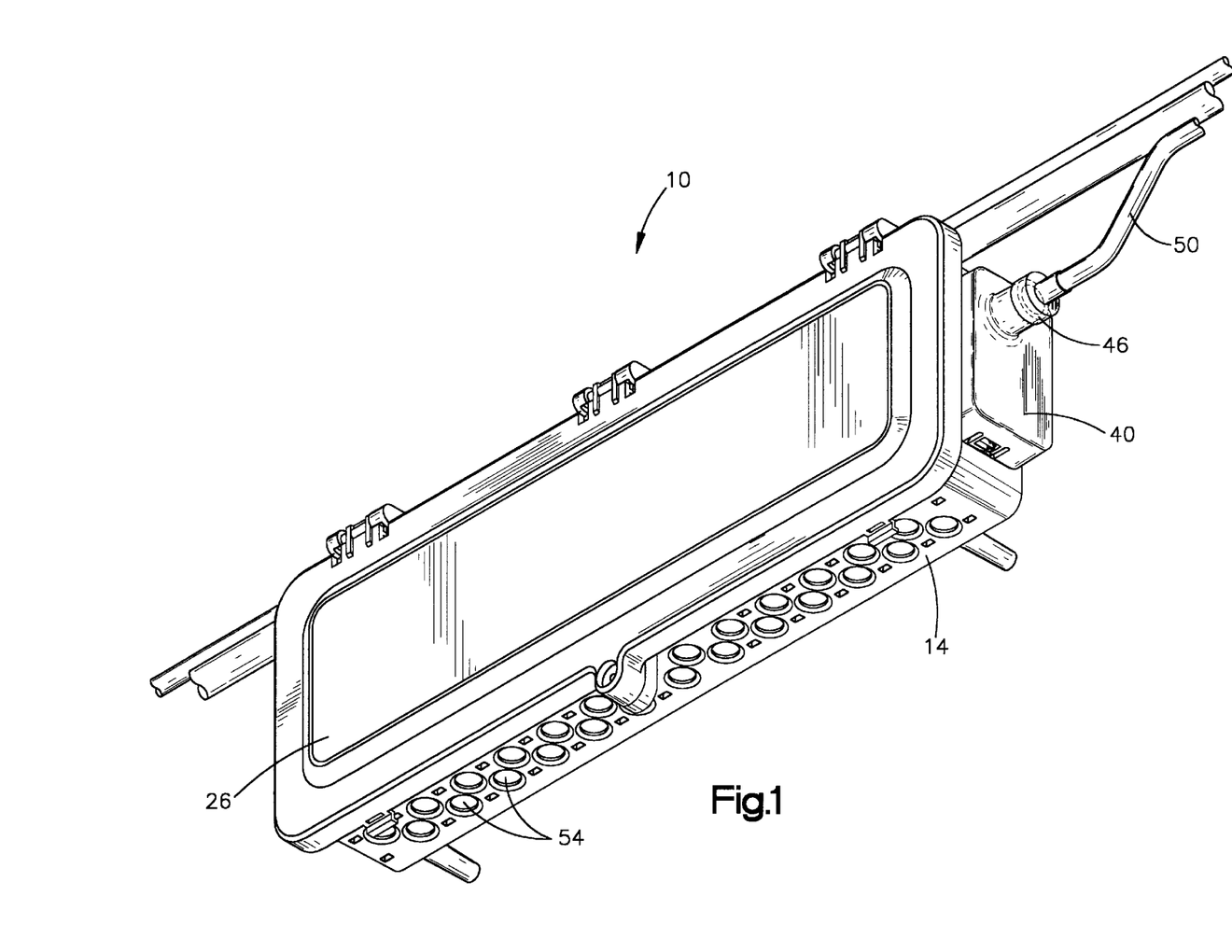
FIG. 1 is a perspective view of a terminal block enclosure constructed in accordance with the present invention.
Figure 2:
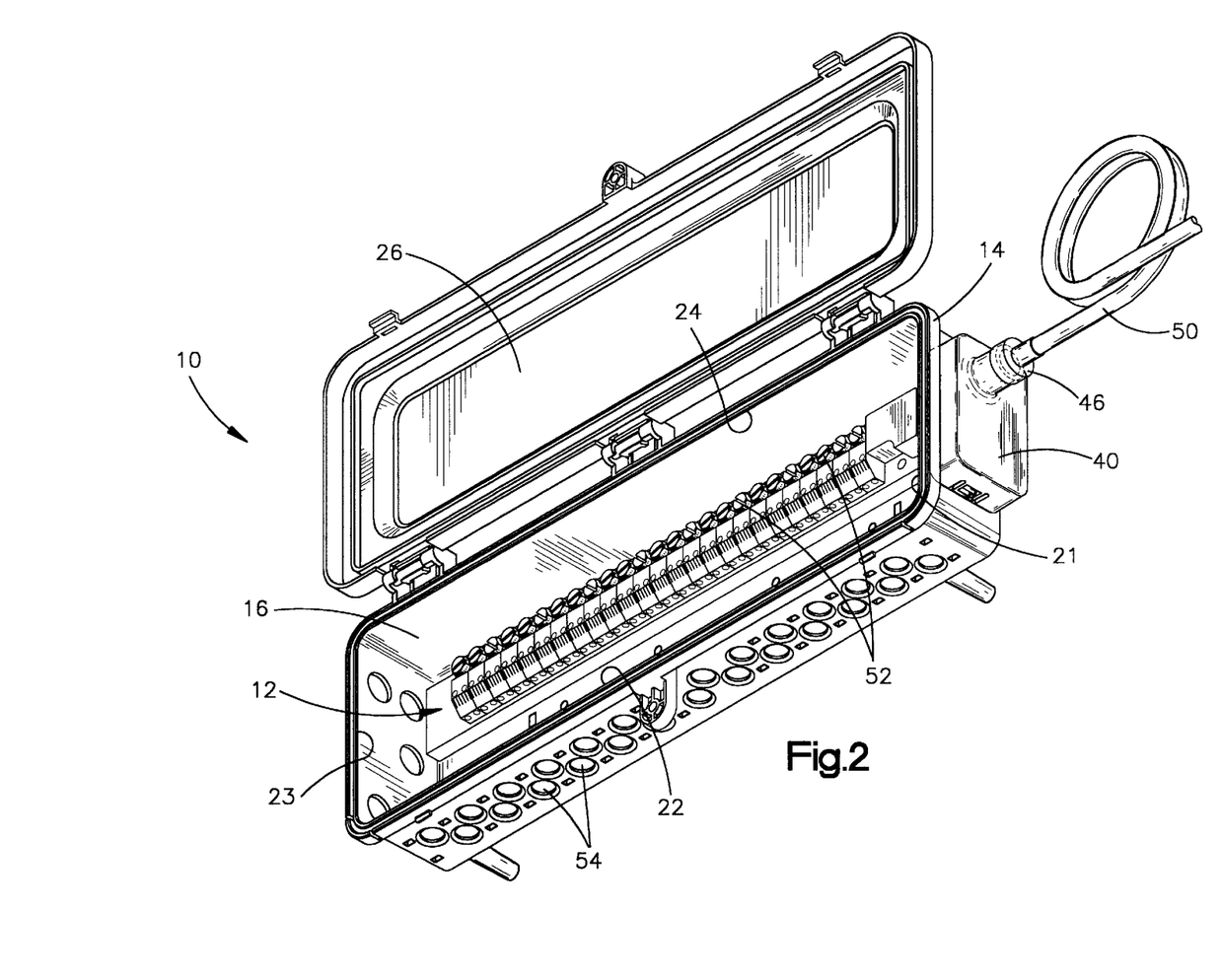
FIG. 2 is a perspective view of the FIG. 1 enclosure with a cover opened to expose a terminal block and electrical cable mounted within the enclosure.
Figure 3:
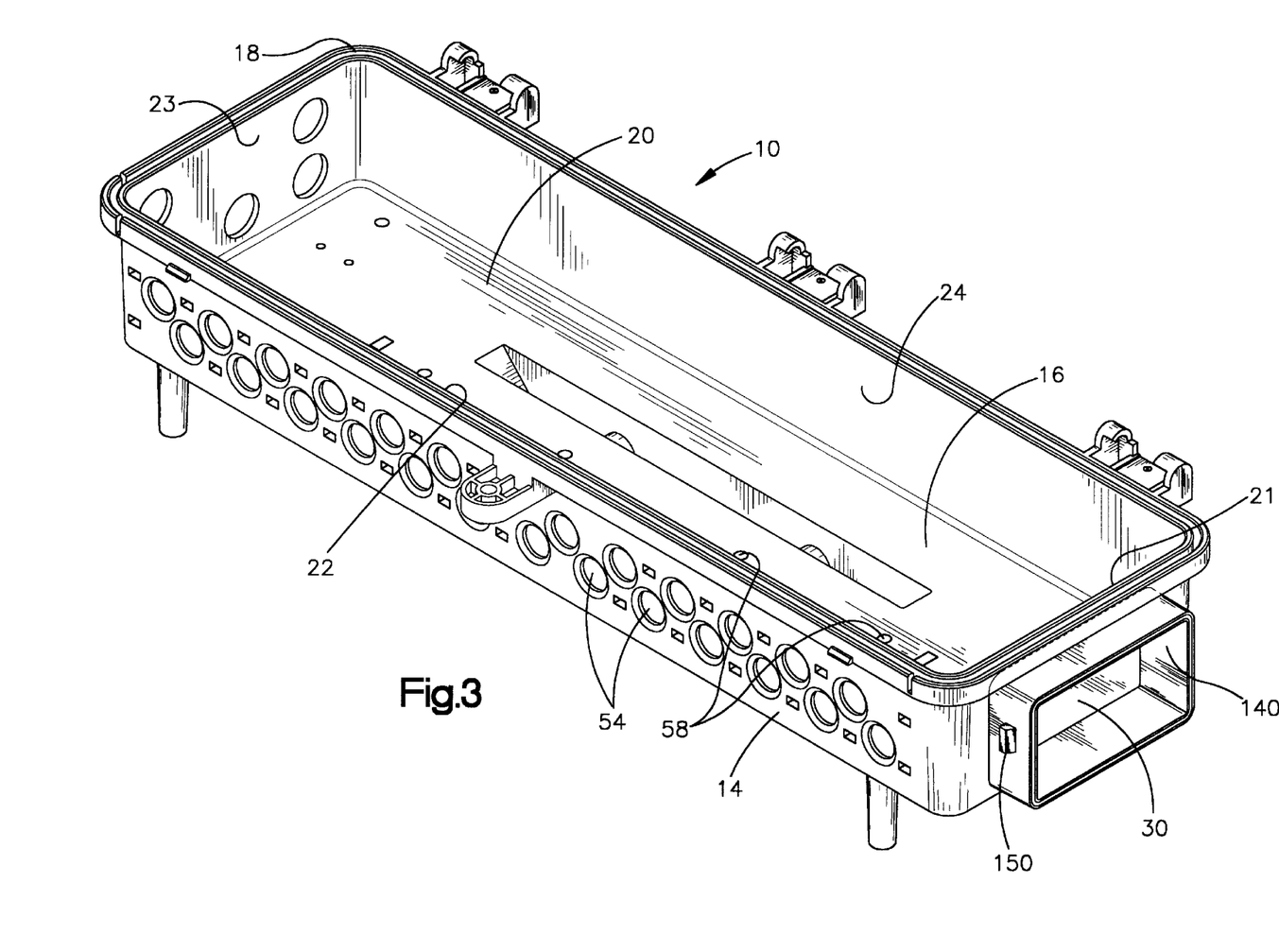
FIG. 3 is a perspective view of the FIG. 1 enclosure showing a terminal block opening.

Referring now to the drawings, FIGS. 1–4 illustrate an enclosure 10 for a terminal block 12. The enclosure 10 is molded from plastic and includes a housing 14 that defines an interior region 16 adapted to contain the terminal block 12 within the enclosure 10. As shown in FIG. 3, the housing 14 includes a rear wall 20 and side walls 21, 22, 23, 24 that border the interior region 16. A front face 18 of the enclosure 10 is open. A cover 26 is connected to the housing 14. As shown in FIG. 1, the cover 26 can be moved to a first position to cover the interior region 16 of the enclosure 10 or, as shown in FIG. 2, to a second position to expose the interior region 16. Opening the cover 26 exposes the terminal to allow communications cable to be attached to the terminal block 12 and routed away from the enclosure 10. One side wall 21 of the housing 14 defines a terminal block opening 30. The size of the terminal block opening 30 is adapted to permit insertion of the terminal block 12 into the interior region 16 through the opening 30. In the preferred and illustrated embodiment, the opening is generally rectangular shaped.

As seen in FIGS. 1 and 2, an entrance cap 40 is adapted to cover the terminal block opening 30. The entrance cap 40 includes a through passage 45 (shown in FIG. 5) sized to permit a cable stub 50 connected to the terminal block 12 to extend through the through passage 45. The through passage 45 provides added support for the cable stub 50 near the entrance cap 40 and provides a surface upon which a shrink-fit seal 46 may be applied. The cable stub 50 is typically reinforced with a metal sheath and manufactured in lengths ranging from 10 to 50 feet. During assembly, a sleeve is heated to form the shrink-fit seal 46 around a portion of the through passage 45 and a portion of the cable stub 50. The shrink-fit seal 46 inhibits the passing of moisture and water into the interior region 16 of the enclosure 10 via the gap between through passage 45 and cable stub 50. The stub 50 contains pairs of source telecommunications wires which, at one end, terminate into the terminal block 12 where they are typically inserted into a filling compound and electrically connected to insulation displacement connectors, or IDCs 52, attached to the terminal block 12. At the other end of the cable stub 50 (not shown), the stub 50 and telecommunications wires therein terminate into a connector adapted to connect to a communications source cable 61. The source cable 61 is typically integrated with a source module such as a 710 connector. The stub 50 contains about 10 to 50 pairs of source wires.

The IDCs 52 are adapted to receive subscriber telecommunications wires that are routed through drop wire entry passages 54 of the enclosure 10 to the subscriber's premises.

Depending on the application, a terminal block 12 having threaded studs, or binding posts, that protrude from the terminal block 12 can be used wherein the subscriber wires are wrapped around the posts and secured with a nut. The terminal block 12 is typically attached to the rear wall 20 of the enclosure 10 by a number of fasteners that extend through holes 58 in the rear wall 20.

Figure 4A:
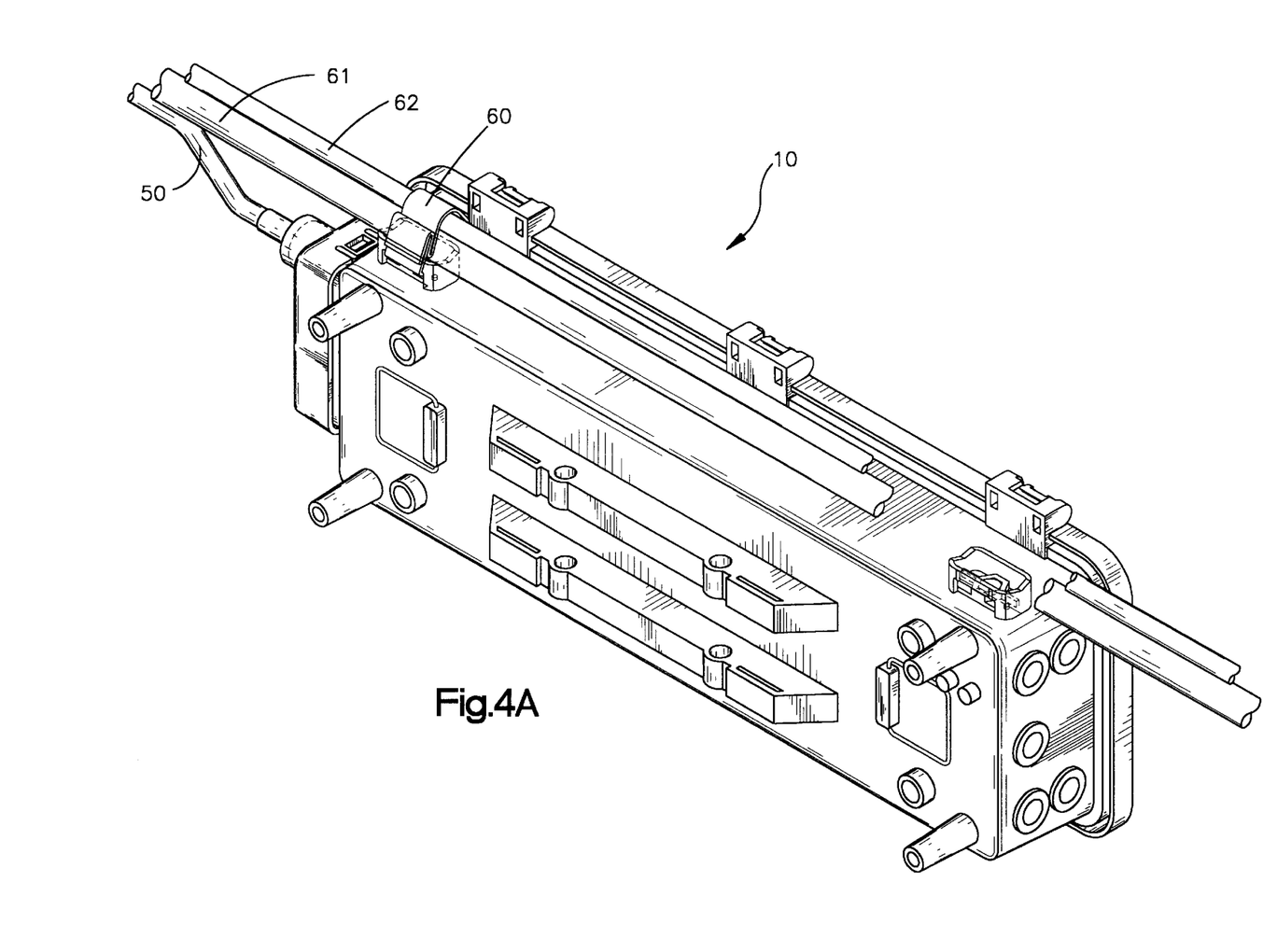
FIGS. 4A is a perspective view of the FIG. 1 enclosure showing the bottom of the enclosure and a strand loop hanger.
Figure 4B:
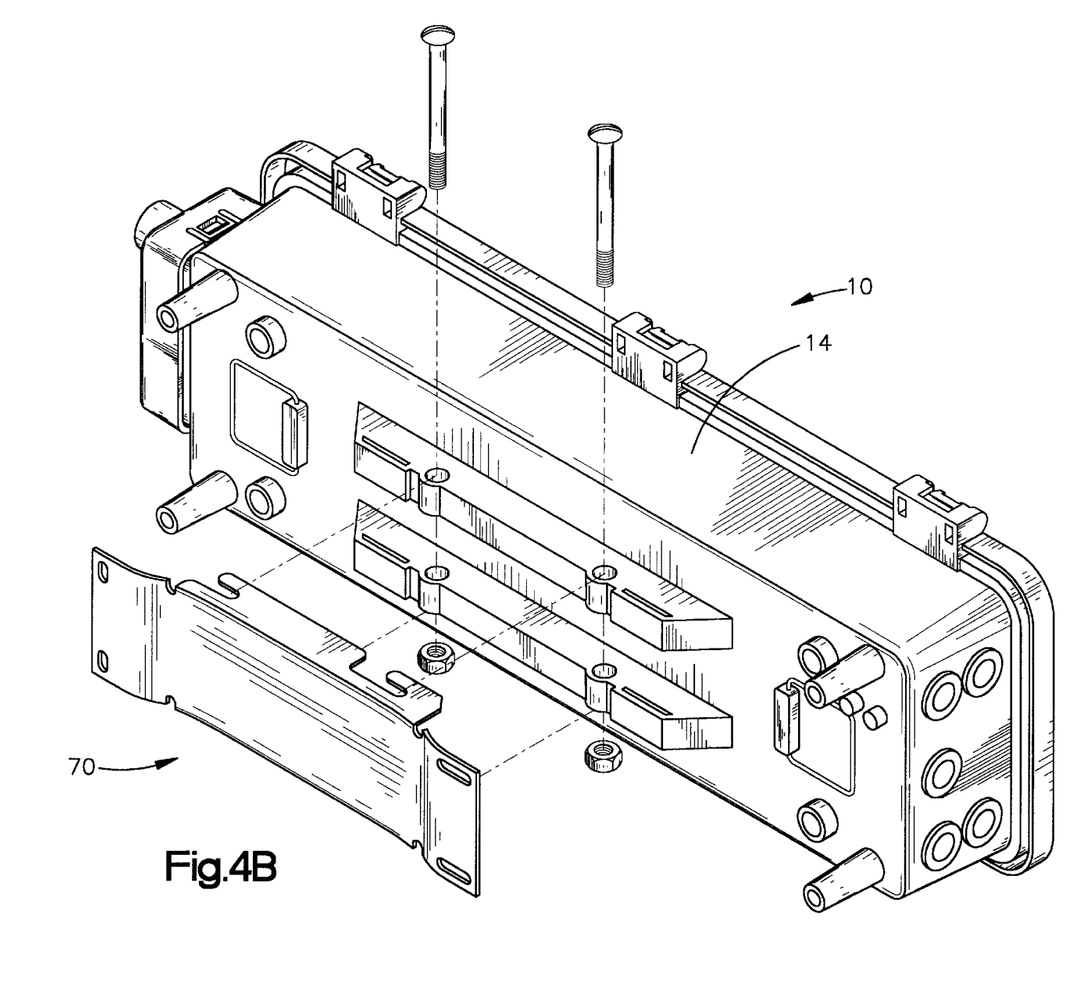
FIG. 4B is a perspective view of the FIG. 1 enclosure showing the bottom of the enclosure and a pole mount bracket.

The enclosure 10 can be adapted to mount in various aerial applications such as pole mount, wall-mount, or strand-mount configurations. For example, FIG. 4A shows the enclosure 10 attached by metal straps 60 around communications source cable 61 and to a support strand 62. As shown in FIG. 4B, the enclosure 10 can also be connected to a pole-mount bracket, indicated generally by reference character 70.

Figures 5, 6:
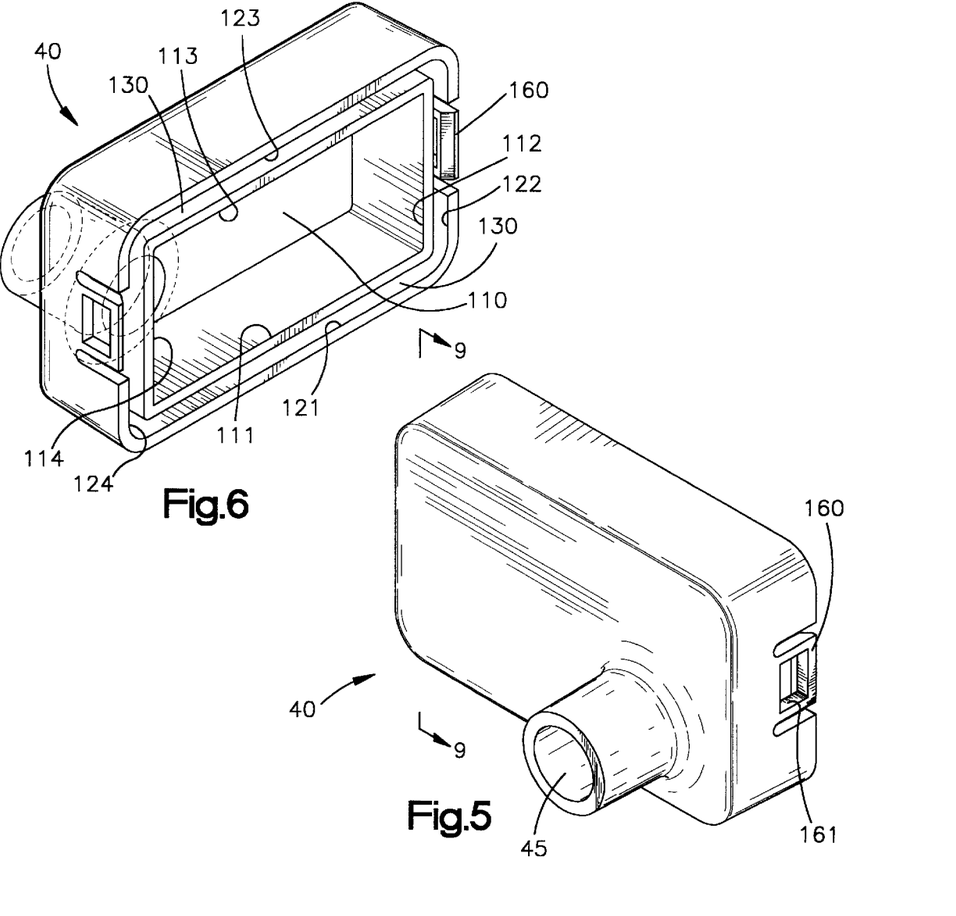
FIG. 5 is a front side perspective view of an entrance cap constructed in accordance with the present invention showing a through passage to accommodate a cable stub.
FIG. 6 is a rear side perspective view of the FIG. 5 entrance cap showing a double wall construction.
Figure 7:
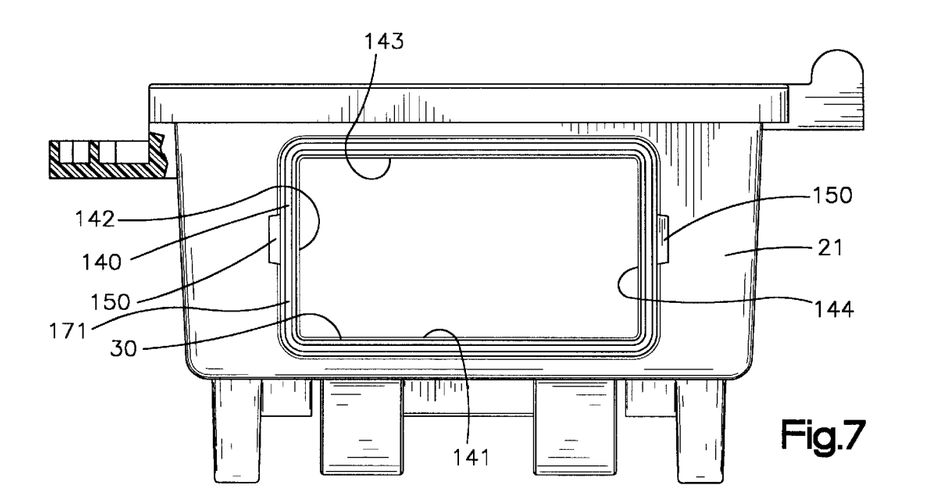
FIG. 7 is an end elevation view of the FIG. 1 enclosure as seen from the plane 7—7 in FIG. 3 showing the terminal block opening.
Figure 8:
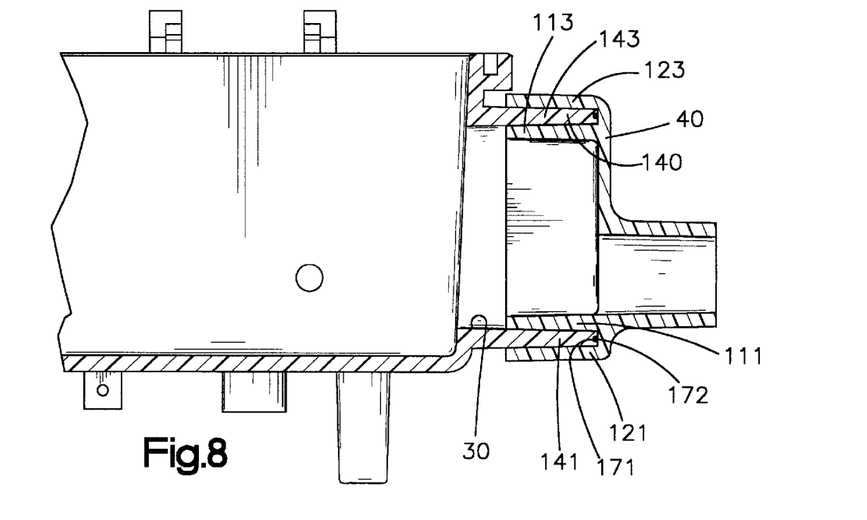
FIG. 8 is a side elevational section view of the FIG. 1 enclosure as seen from the plane 8—8 in FIG. 10 showing one end of the enclosure with a cover removed.

FIGS. 5 and 6 show a perspective view of a front and rear side, respectively, of the entrance cap 40. The entrance cap 40 is molded from plastic and comprises a double wall construction. A rear wall 110 and interior side walls 111, 112, 113, 114 that are generally parallel in relation to exterior side walls 121, 122, 123, 124, together form a recess 130. As shown in FIG. 7, the wall 21 of the enclosure 10 includes a generally rectangular flange 140 extending outwardly from a surface of the wall 21 that defines the boundary of the terminal block opening 30. The flange 140 comprises walls 141, 142, 143, 144. The recess 130 of the entrance cap 40 is adapted to receive the flange 140 when the entrance cap 40 is pushed over the flange 140. As shown in FIG. 8, the recess 130 is sized so that the flange 140 and the entrance cap 40 form an interference fit when the entrance cap 40 is attached to the enclosure 10. Thus, the walls 141, 142, 143, 144 of the flange 140 are wedged between the respective interior walls 111, 112, 113, 114 and exterior walls 121, 122, 123, 124 of the entrance cap 40. This interference fit secures the entrance cap 40 to the enclosure 10 and creates a seal to inhibit the passing of moisture or water into the enclosure 10 via the terminal block opening 30.

Figure 9:
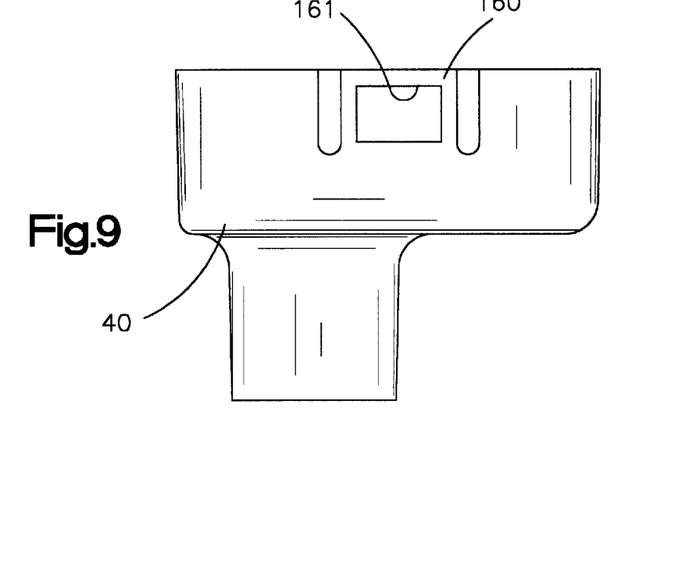
FIG. 9 is a side elevation view of the FIG. 5 entrance cap as seen from the plane 9—9 in FIG. 5.
Figure 10:
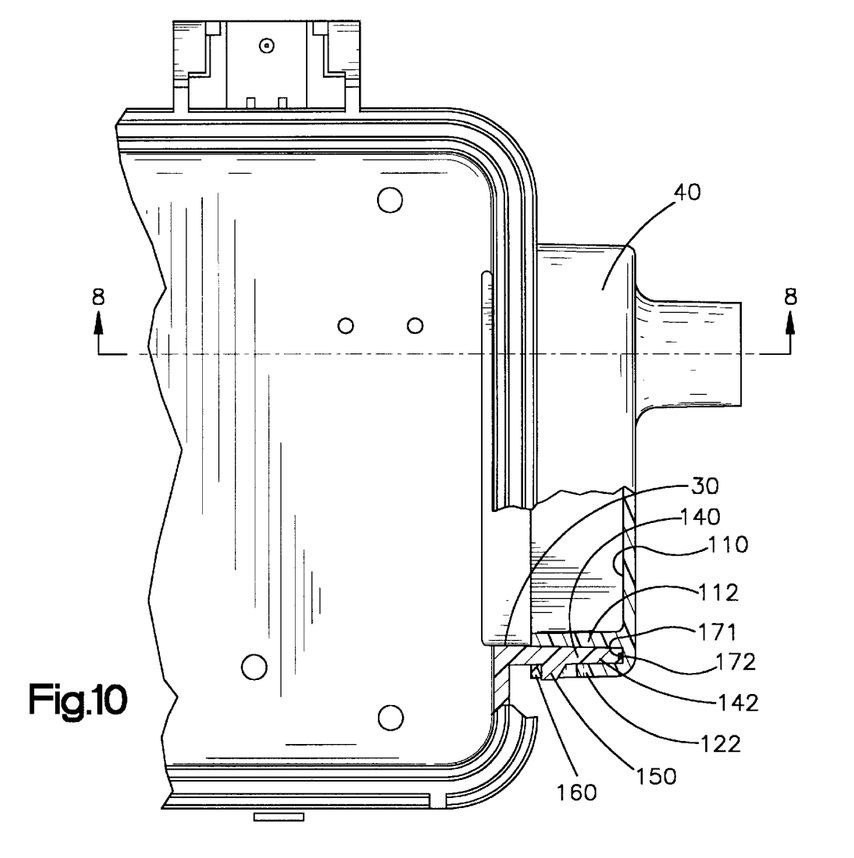
FIG. 10 is a broken plan view on an enlarged scale of the FIG. 1 enclosure showing the terminal block opening of the enclosure and a broken section view of the entrance cap attached to the enclosure.

According to the invention, the flange 140 further includes ramped projections 150 that extend from the walls 142, 144 of the flange 140. Corresponding exterior walls 122, 124 of the entrance cap 40 include flexible retaining tabs 160 that flex outward as they engage the ramped projections 150. As shown in FIG. 9, the retaining tabs 160 define receiving notches 161 that receive the ramped projections 150 after the entrance cap 40 is pushed over the flange 140. As shown in FIG. 10, the ramped projections 150 and retaining tabs 160 provide a locking feature that substantially inhibits disengagement of the entrance cap 40. FIGS. 8 and 10 show that the flange 140 also defines a groove 171 to accommodate a gasket or O-ring 172. When the entrance cap 40 is pushed over the flange 140 the gasket 172 sealingly engages the entrance cap 40 so that dust, moisture, or other foreign substances are further substantially inhibited from entering the enclosure 10 through the terminal block opening 30 of the enclosure 10.

According to the disclosed invention, the enclosure 10 and entrance cap 40 provide several advantages over prior art enclosures. Prior art enclosures require the cable stub to be fed through an opening in the enclosure from the inside of the enclosure before the assembler can mount the terminal block to a wall in the enclosure. Conventional terminal blocks are manufactured with the cable already connected to the terminal block before inserting the terminal block into the enclosure. When installing the terminal block, the installer typically unravels the cable stub before inserting the cable stub through the enclosure opening. This process can be tedious and time consuming due to the cable stub having a metal sheath reinforcement and having to be pushed through a tight fitting grommet. The installer can attempt to reduce these complications by covering the cable stub in lubricant before unwinding the cable stub. However, by doing so, the installer incurs additional labor, inconvenience, time and costs.

The disclosed invention simplifies installing the terminal block 12 and cable stub 50 within the enclosure 10. During manufacture of the enclosure the cable stub 50 is inserted through the through passage 45 of the entrance cap 40 prior to connecting the cable 50 and its conductors therein to the terminal block 12. Accordingly, assembly time is reduced because the installer need not unwind or lubricate the cable 50. The installer simply inserts the terminal block 12, with the cable stub 50 connected thereto, through the terminal block opening 30 and then pushes the entrance cap 40 over the flange 140 to secure the entrance cap 40 to the enclosure 10. The awkward cable-feed step needed in the prior art procedure is eliminated, thereby reducing handling difficulties and saving installation time.

If the cable stub 50 is already attached to the terminal block 12 (if the terminal block 12 and cable 50 are assembled, for example, at a location other than where the enclosure 10 is assembled), the assembler simply slides the entrance cap 40 over the cable stub 50. This procedure is more time efficient and less cumbersome than the prior art procedure which requires the installer to manipulate the cable and terminal block simultaneously when pushing the cable through an enclosure opening. Accordingly, existing cable and terminal block assemblies can be used in conjunction with the enclosure 10 and entrance cap 40 of the present invention to simplify manufacturing and to save time and costs.

Figure 11:
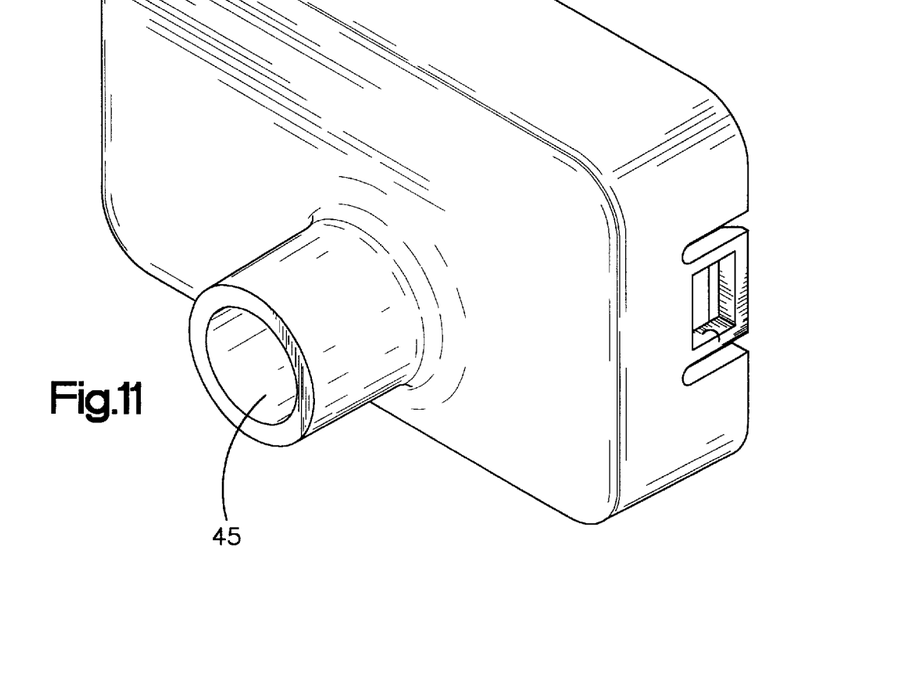
FIG. 11 is a perspective view of an alternate embodiment of an entrance cap constructed in accordance with the invention.

The entrance cap 40 can be retrofitted to accommodate different types of cable and terminal block assemblies. FIG. 11 shows an entrance cap 40 constructed in accordance with an alternative embodiment of the invention wherein the through passage 45 is centrally located along the lower portion of the entrance cap 40. The location of the through passage 45 will vary depending on the application.

Figure 12:
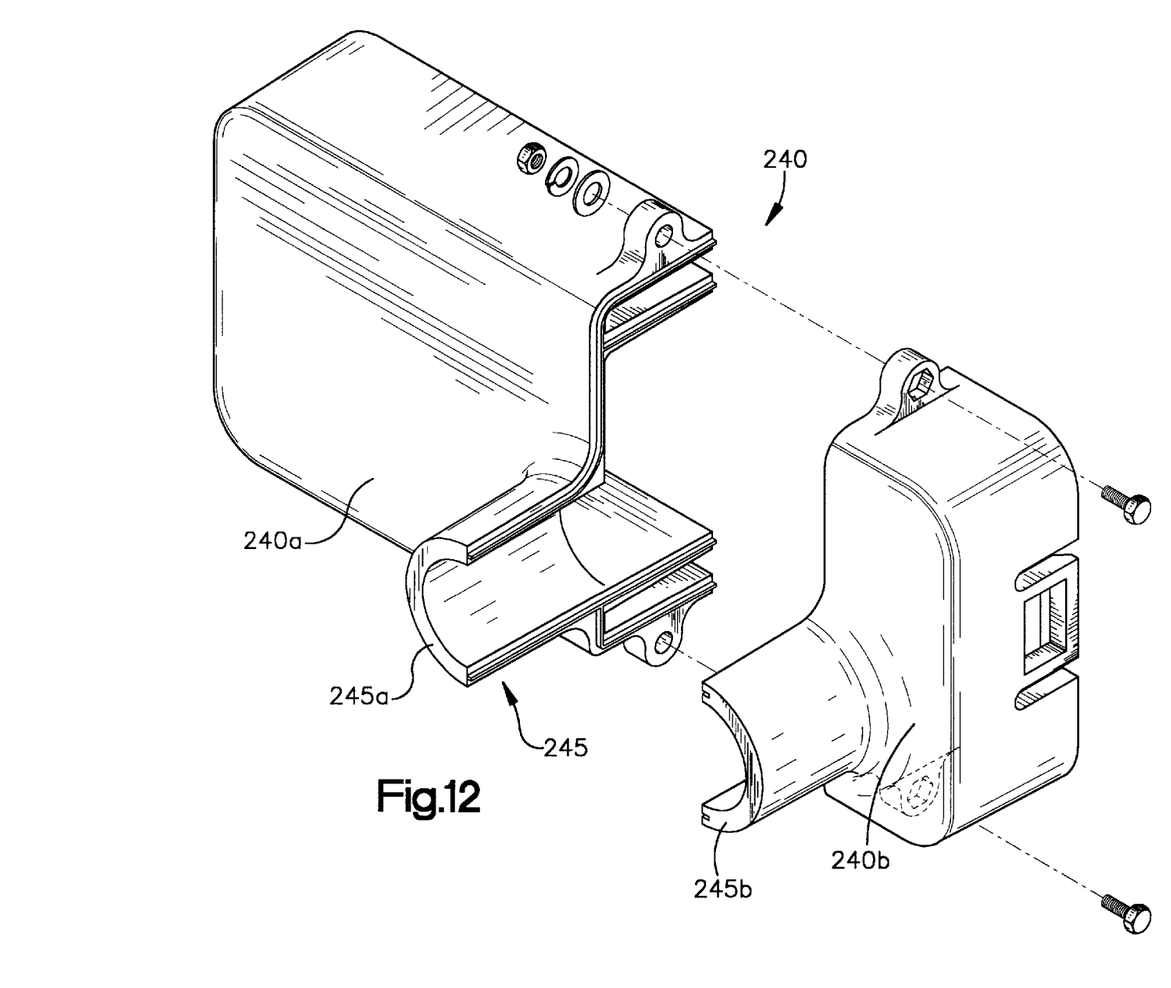
FIG. 12 is a perspective view of an additional alternate embodiment of the present invention.

An alternate entrance cap 240 can also be retrofitted for terminal blocks 12 installed in existing pole-mounted, wall-mounted, or strand mounted terminal block enclosures. The entrance cap 240 can comprise multi-piece, or segmented, construction so that the cap 240 is assembled laterally around the cable stub 50 before attaching the entrance cap 240 to the enclosure 10. As shown in FIG. 12, the disclosed entrance cap 240 has two mating pieces 240a, 240b. Any number of attachable mating pieces can be used, however. A through passage 245 of the entrance cap 240 is formed by through passage segments 245a, 245b when the multi-piece entrance cap 240 is assembled. The multiple segments can be attached with a locking mechanism, an adhesive or by fasteners.

A multi-piece constructed entrance cap 240 provides several advantages over prior art enclosures. An existing terminal block enclosure that is damaged or otherwise in need of replacement can be replaced at the subscriber's premises with a multi-piece constructed entrance cap 40 and an enclosure 10 as described in the present invention without having to disconnect the cable 50 from the source cable 61 and without performing the tedious cable-feed step necessary in the prior art procedure. Since the existing terminal block and cable need not be returned to the factory, a substantial amount of assembly time and communications line downtime is saved.

An installer disconnects the subscriber lines from the existing terminal block and removes them from the drop wire entry passages. The installer then simply detaches the existing terminal block and then cuts away the wall through which the existing cable extends thereby separating the terminal block from the damaged enclosure. A new enclosure 10 adapted to accommodate the existing terminal block is installed. The multi-piece entrance cap 240 is constructed laterally around the existing cable stub and then attached to the enclosure 10. The existing terminal block can be attached to a wall of the enclosure 10 before or after the multi-piece entrance cap 40 is attached to the enclosure 10.

An enclosure 10 embodying the present invention has been built and includes the following dimensions: a depth of approximately 3 inches, a length of about 21 inches, and a width of about 7 inches. The through passage 30 is about 3½ inches wide and 2 inches in height. The flange 140, which defines the boundary of the terminal block opening 30, is approximately 1¼ inches deep. The entrance cap 40, which receives the flange 140 and covers the terminal block opening 30, is about 4 inches wide, 2½ inches in height, and about 1¼ inches deep. The enclosure and end cap are most preferably constructed from ABS plastic but a PVC/ABC blend may also be used.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

I claim:

1. An enclosure for a terminal block, comprising:
   a) a housing defining an interior region adapted to contain a terminal block therein; said housing having an open front face and including a rear wall, and a number of side walls that border the interior region;
   b) a cover connected to said housing and moveable to a first position to cover said front face to close the interior region and moveable to a second position to expose the interior region;
   c) one of said side walls of said housing having a terminal block opening sized to permit insertion therethrough of the terminal block; and,
   d) an entrance cap adapted to cover the terminal block opening and having a through passage sized to permit a cable connected to the terminal block to extend through said through passage;
   e) said entrance cap being completely surrounded along an edge of said entrance cap by portions of said one side wall.

2. The enclosure of claim 1, wherein said one side wall includes a flange extending outwardly from a surface of said one side wall near the perimeter of said terminal block opening and said entrance cap defines a recess adapted to receive said flange when said entrance cap is pushed over said flange to secure said entrance cap.

3. The enclosure of claim 2, wherein said flange includes a ramped projection and said entrance cap includes a flexible retaining tab that is operative to flex as the entrance cap is pushed over said ramped projection and which defines a notch that receives said ramped projection after said entrance cap is pushed over said flange.

4. The enclosure of claim 2, wherein said flange defines a groove to accommodate a gasket that sealingly engages said entrance cap after said entrance cap is pushed over said flange.

5. The enclosure of claim 1, wherein said entrance cap comprises a number of attachable mating segments which combine to form said through passage so that a cable extends through said through passage when said segments are laterally assembled around the cable.

6. The apparatus of claim 1, further including a terminal block attached to said rear wall of the housing.

7. A terminal block enclosure in combination with a terminal block, the combination comprising:
 a) a terminal block, wherein the terminal block has a depth, length and width; and
 b) an enclosure, wherein the enclosure includes:
  i) a housing defining an interior region adapted to contain the terminal block, wherein the housing has a depth, length and width that are relatively larger than the respective depth, length and width of said terminal block; said housing having an open front face and including a rear wall, and a number of side walls that border the interior region;
  ii) a cover connected to said housing and moveable to a first position to cover said front face to close the interior region and moveable to a second position to expose the interior region;
  iii) one of said side walls of said housing having a terminal block opening sized to permit insertion therethrough of said terminal block, the terminal block opening having a depth and width that are relatively larger than the respective depth and width of said terminal block and relatively smaller than the respective depth and width of said housing; and,
  iv) an entrance cap adapted to cover the terminal block opening and having a through passage sized to permit a cable connected to the terminal block to extend through said through passage.

8. An enclosure for a terminal block, comprising:
 a) a housing defining an interior region adapted to contain a terminal block therein; said housing having an open front face and including a rear wall, and a number of side walls that border the interior region;
 b) a cover connected to said housing and moveable to a first position to cover said front face to close the interior region and moveable to a second position to expose the interior region;
 c) one of said side walls of said housing having a terminal block opening sized to permit insertion therethrough of the terminal block, said one side wall defining a continuous boundary near the perimeter of said terminal block opening; and,
 d) an entrance cap adapted to cover the terminal block opening and having a through passage sized to permit a cable connected to the terminal block to extend through said through passage.

9. The enclosure of claim 8, wherein a surface of said one side wall includes a rectangular-shaped flange extending outwardly therefrom near the perimeter of said terminal block opening.

10. The enclosure of claim 9, wherein said entrance cap defines a generally rectangular-shaped recess adapted to receive said flange when said entrance cap is pushed over said flange to secure said entrance cap.

11. The enclosure of claim 10, wherein said flange comprises four walls and the recess is defined by four interior side walls and four relatively parallel exterior side walls, so that when the entrance cap is attached to the enclosure the four walls of the flange are wedged between the respective interior walls and exterior walls of said entrance cap to form an interference fit therebetween.

* * * * *